US011853462B1

(12) United States Patent
Tico et al.

(10) Patent No.: US 11,853,462 B1
(45) Date of Patent: Dec. 26, 2023

(54) METHODS AND SYSTEMS FOR ACCEPTING DATA FROM USERS BY DISAGGREGATION OF USERS IDENTITY

(71) Applicant: Minerva Tico, San Francisco, CA (US)

(72) Inventors: Minerva Tico, San Francisco, CA (US); Tracy Donovan Drake, San Francisco, CA (US)

(73) Assignee: Minerva Tico

( * ) Notice: Subject to any disclaimer, the term of this patent is extended or adjusted under 35 U.S.C. 154(b) by 0 days.

(21) Appl. No.: 18/306,897

(22) Filed: Apr. 25, 2023

(51) Int. Cl.
*G06F 21/62* (2013.01)

(52) U.S. Cl.
CPC .. *G06F 21/6254* (2013.01); *G06F 2221/2115* (2013.01); *G06F 2221/2117* (2013.01)

(58) Field of Classification Search
CPC ......... G06F 21/6254; G06F 2221/2115; G06F 2221/2117
See application file for complete search history.

(56) References Cited

U.S. PATENT DOCUMENTS

| | | | |
|---|---|---|---|
| 6,807,569 B1 | 10/2004 | Bhimani et al. | |
| 9,501,618 B1 | 11/2016 | Wurst | |
| 9,779,252 B2 | 10/2017 | Sharma et al. | |
| 10,728,596 B2 | 7/2020 | Brown | |
| 2017/0070480 A1 | 3/2017 | Blumenfeld et al. | |
| 2019/0287686 A1* | 9/2019 | Takeda ................ | G06F 21/6254 |
| 2020/0286400 A1* | 9/2020 | Jackson ................ | G16H 10/60 |
| 2022/0391537 A1* | 12/2022 | Gotthardt .............. | H04L 9/0825 |

FOREIGN PATENT DOCUMENTS

EP 3817002 A1 5/2021

OTHER PUBLICATIONS

Online Data Collection Confidentiality Issues, Shepherd University, Jul. 2022, URL: <https://web.archive.org/web/20220705084528/https://www.shepherd.edu/app/uploads/2022/05/Online-Data-Collection-IRB-Issues-20211012.pdf>.*
How survey quality control checks support accurate insights, Kantar, Apr. 2022, URL: <https://www.kantar.com/north-america/inspiration/research-services/how-survey-quality-control-checks-support-accurate-insights-pf>.*
Best Practices for Protecting Individual Privacy in Conducting Survey Research, Information and Privacy Commissioner of Ontario, 2015, URL: <https://www.ipc.on.ca/wp-content/uploads/2015/04/best-practices-for-protecting-individual-privacy-in-conducting-survey-research.pdf>.*

* cited by examiner

*Primary Examiner* — Minh Dinh
(74) *Attorney, Agent, or Firm* — Kanika Radhakrishnan; Evergreen Valley Law Group

(57) ABSTRACT

The present invention relates to methods and systems for accepting data from users by disaggregation of user's identity. The method performed by a server system includes receiving a request from a user device of a user for registering to a private non-interactive platform. The method includes generating a unique identifier for the user. The unique identifier provides access to the user to login to the private non-interactive platform and at least one research service rendered in the private non-interactive platform. Further, the method includes transmitting the unique identifier and a unique link appended with a research topic to the user device. The method includes validating user information related to the research topic based on validation rules. The method includes facilitating anonymous aggregation of the deidentified user information related to the research topic with other users' submitted information associated with the research topic.

16 Claims, 9 Drawing Sheets

METHODS AND SYSTEMS FOR ACCEPTING DATA FROM USERS BY DISAGGREGATION OF USERS IDENTITY

TECHNICAL FIELD

The present invention relates generally to data collection and data privacy, and more particularly relates to methods and systems for reducing barriers to collect sensitive information (community-led research) implemented in current use with potential access to a private non-interactive community.

BACKGROUND

Currently, social media platforms are widely used by people around the world to share information, make and maintain connections, develop individual interests, and for entertainment. However, social media platforms introduce some significant issues and limitations, such as: personal privacy and data privacy concerns, the general requirement to accept reactions or comments (i.e., judgment) from others in response to what users contribute, share or post, uncertain quality of user-generated content, negative comparisons with others, and algorithms designed to increase engagement time.

Further, many global issues and/or sensitive topics require a collection of data from a given population. To that effect, numerous private online community platforms have emerged in recent years for data collection related to global and/or sensitive issues. The private online community platforms provide a virtual space for a group of people similar in interests, goals, or other commonalities (including identity, purpose, or ideologies) to connect, interact and build relationships with each other. However, as with public social media platforms, the traditional private online community platforms have been designed to promote and enable direct interaction among users, including the ability for users to select a profile/avatar/username, potentially further intentionally or unintentionally disclosing their personal identity or exposing personally identifiable information. Similar to the limitations possessed by social media platforms, direct interaction among members in private online community platforms requires extensive moderation for compliance and involves liability issues. Additionally, the members who might be able to offer knowledge or input in the private online community platforms would be leery of doing so due to risk factors and sensitivities involved in the linkage of their personal identity with the input or data they provide within the community, as well as the exposure of appearing on member directory lists for such groups. Furthermore, they would still have to contend with the judgment and responses or comments of others (likely impacting their willingness to contribute knowledge or input with candor or without self-censoring). Importantly, these private interactive communities offer little to no wider public benefit because knowledge shared by users is confined within the community, generally remains at the individual user level, and exists without a means for aggregating research without linkage to individual contributors' personal identities or a means for making aggregated and de-identified data available for public benefit.

Therefore, there is a need for methods and systems to promote and enable the ability to submit and contribute data, insights, and relevant content through a private and non-interactive community platform without exposing an individual's identity or introducing privacy-related risks, in addition to providing other technical advantages. There is a need for methods and systems to prevent members of a private community from interacting directly with one another, and that prevents members from intentionally or unintentionally revealing or sharing their personal identity or personally identifying information with others via a member directory, individual posts, or comments. Finally, there is a need for methods and systems that prevent members from having any visibility to the user IDs of other members or the ability to ascertain user ID information.

SUMMARY

Various embodiments of the present disclosure disclose methods and systems for reducing barriers to collect sensitive information (community-led research) implemented in current use with potential access to a private non-interactive community.

In an embodiment, a computer-implemented method is disclosed. The computer-implemented method performed by a server system includes receiving a request from a user device of a user for registering to a private non-interactive platform that offers anonymous and one-way communication. The method includes generating a unique identifier for the user upon receipt of the request, thereby enabling successful registration of the user in the private non-interactive platform. The unique identifier provides access to the user to at least login to the private non-interactive platform and at least one research service rendered in the private non-interactive platform. Further, the method includes transmitting the unique identifier and a unique link appended with a research topic rendered in the private non-interactive platform, to the user device of the user. The method further includes validating user information including data and insights related to the research topic based at least on a set of validation rules. The method includes facilitating the anonymous aggregation of the deidentified user information related to the research topic with other users' submitted information associated with the research topic.

In another embodiment, a server system is disclosed. The server system includes a memory configured to store instructions and a processor. The processor is configured to execute the instructions stored in the memory and thereby cause the server system to at least receive a request from a user device of a user for registering to a private non-interactive platform that offers anonymous and one-way communication. The server system is configured to generate a unique identifier for the user for successfully registering the user in the private non-interactive platform. The unique identifier provides access to the user to at least login to the private non-interactive platform and at least one research service rendered in the private non-interactive platform. Further, the server system is configured to transmit the unique identifier and a unique link appended with a research topic rendered in the private non-interactive platform, to the user device of the user. The server system is further configured to validate user information including data and insights related to the research topic based at least on a set of validation rules. The server system is configured to facilitate, anonymous aggregation of the deidentified user information related to the research topic with other users' submitted information associated with the research topic.

BRIEF DESCRIPTION OF THE FIGURES

The following detailed description of illustrative embodiments is better understood when read in conjunction with the appended drawings. For the purposes of illustrating the present disclosure, exemplary constructions of the disclosure are shown in the drawings. However, the present disclosure is not limited to a specific device, or a tool and instrumentalities disclosed herein. Moreover, those in the art will understand that the drawings are not to scale. Wherever possible, like elements have been indicated by identical numbers.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or conjunction with each other, one skilled in the art will appreciate that many of these features can be provided independently of other features.

Various embodiments of the present invention are described hereinafter with reference to FIG. 1 to FIG. 8.

Figure 1:
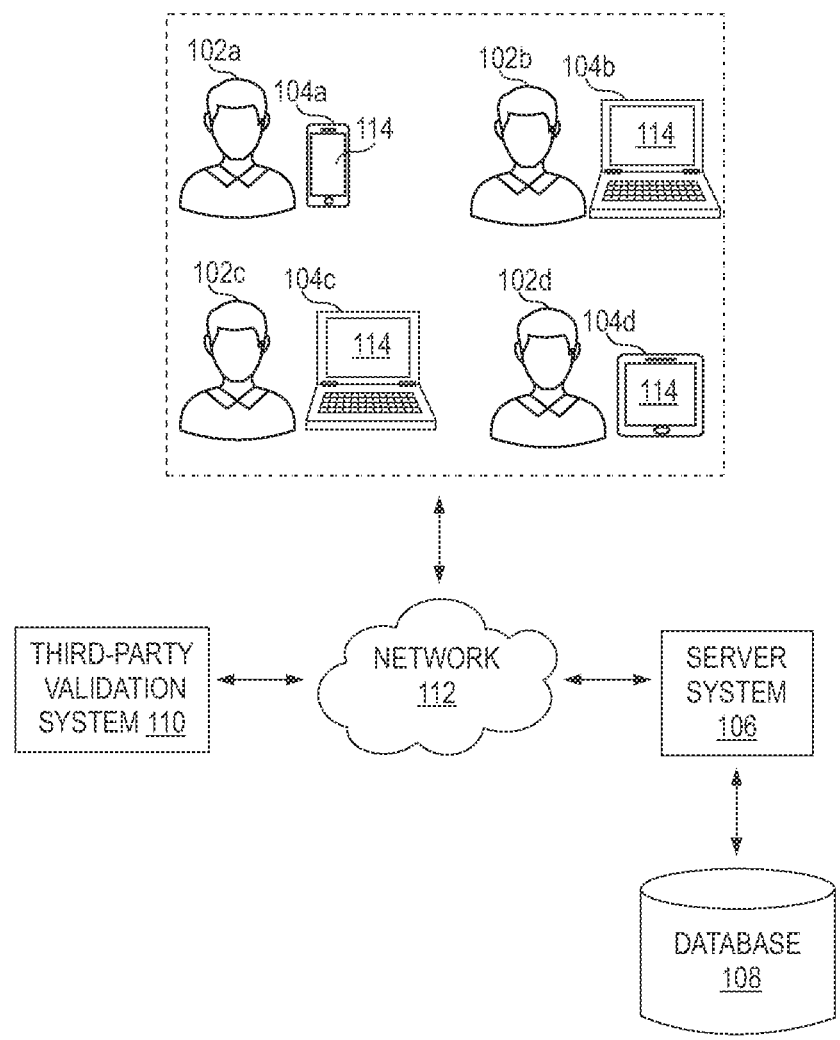
FIG. 1 illustrates an example representation of an environment related to at least some example embodiments of the present disclosure.

FIG. 1 illustrates an example representation of an environment 100 related to at least some example embodiments of the present disclosure. Although the environment 100 is presented in one arrangement, other arrangements are also possible where the parts of the environment 100 (or other parts) are arranged or interconnected differently. The environment 100 is configured to perform one or more operations such as providing a non-interactive platform for users to submit their contents (or sensitive information) anonymously. As shown, the environment 100 includes a plurality of users. The plurality of users includes as a user 102a, a user 102b, a user 102c and a user 102d. Each of the users 102a-102d is associated with a user device 104a, a user device 104b, a user device 104c and a user device 104d, respectively. As shown, the user device 104a is exemplarily depicted to be a mobile phone, the user devices 104b and 104c are exemplarily depicted to be a computer and the user device 104d is exemplarily depicted to be a portable personal computer (or a tablet). Alternatively, the users 102a-102d may be provided with any other user devices which serves the purpose.

The environment 100 further includes a server system 106, a database 108 associated with the server system 106 and at least one third-party validation system 110. Each of the entities of FIG. 1 is communicably coupled to each other via a network 112. The network 112 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among the entities illustrated in FIG. 1, or any combination thereof.

Various entities in the environment 100 may connect to the network 112 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof. For example, the network 112 may include multiple different networks, such as a private network made accessible by the server system 106, separately, and a public network (e.g., the Internet, etc.).

In one embodiment, the server system 106 is configured to perform one or more of the operations described herein. Specifically, the server system 106 is configured to host and manage a private non-interactive platform (see, 114). The private non-interactive platform 114 can be referred to as a private online community (or an application) that offers anonymous and one-way communication to the users 102a-102d. In general, the private non-interactive platform 114 may be a private community. In an embodiment, the private non-interactive platform 114 renders services related to community-led research, or citizen science, a growing field currently challenged by significant limitations in the adoption and use of supporting technology for efficacy and scale. For description purposes, the private non-interactive platform 114 is explained with reference to rendering services related to anonymously submitting content related to the research topic (i.e., community-led research). Alternatively, the private non-interactive platform 114 may render a privacy-based collective for submitting artistic work, or any other services, therefore it should not be taken to limit the scope of the present disclosure.

In an embodiment, the user devices 104a-104d are equipped with an instance of the private non-interactive platform 114. The private non-interactive platform 114 is a set of computer-executable codes configured to provide user interfaces (UIs) to the users 102a-102d for at least anonymously submitting the content or data and insights related to the research topic. As explained above, the private non-interactive platform 114 is hosted and managed by the server system 106. In an embodiment, the server system 106 may render the instance of the private non-interactive platform 114, in response to the receipt of a request from the user devices 104a-104d via the network 112. In some embodiments, the private non-interactive platform 114 may be accessed through the website over the network 112 using web browser applications installed in the user device (e.g., the user devices 104a-104d).

The user 102a may be an individual who wishes to anonymously submit the content related to research topics or community-led research, etc., in the private non-interactive platform 114. Further, the users 102b, and 102d are referred to members of the private non-interactive platform 114. The members (or the users 102b 102d) may be the registered users 102b and 102d. The user 102c may be an administrator of a community in the private non-interactive platform 114. It is to be noted that an individual is required to register for the private non-interactive platform 114 for utilizing the services rendered in the private non-interactive platform 114. As such, the user 102a is required to undergo a one-time registration process for utilizing the services of the private non-interactive platform 114.

The user 102a may be provided with a user interface (UI) for receiving user inputs related to unique contact information of the user 102a for registering to the private non-interactive platform 114. Thereafter, a request from the user device 104a of the user 102a is transmitted to the server system 106 for registering to the private non-interactive platform 114. In an embodiment, the request may include the user inputs such as an email address of the user 102a. It is to be noted that the request is initiated from a public platform equipped in the user device 104a to the server system 106 without authentication of the user inputs.

Thereafter, the server system 106 is configured to generate a unique identifier for the user 102a. The generation of the unique identifier corresponds to successful registration of the user 102a in the private non-interactive platform 114. The user 102a may utilize the unique identifier to at least login to the private non-interactive platform 114 and access at least one research service rendered in the private non-interactive platform 114. The assignment of the unique identifier establishes the user 102a as a registrant (or a registered user) in the private non-interactive platform 114, thereby preventing unintentional identity exposure of the user 102a in the private non-interactive platform 114. In an embodiment, the server system 106 may assign the unique identifier to the user 102a based on validation of the unique contact information of the user performed by the third-party validation system 110. Further, the user 102a assigned with the unique identifier is provided with a subscriber membership status.

Upon assignment of the unique identifier, the server system 106 transmits the unique identifier to the user device 104a of the user 102a along with a unique link. The unique link is appended with at least one research topic being hoisted (or created) in the private non-interactive platform 114. The user 102a provides data and insights related to the research topic in the private non-interactive platform 114. The data and insights correspond to user information related to the research topic. Thereafter, the user information including the data and insights related to the research topic is validated by the server system 106 based at least on a set of validation rules. In other words, the server system 106 applies the set of validation rules to determine cuts of the data in the user information provided by the user 102a related to the research topic.

Upon successful validation, the server system 106 facilitates the user 102a to anonymously submit the user information including data and insights related to the research topic in the private non-interactive platform 114. In addition, the server system 106 may provide a differentiated access based on the user 102a who has contributed to the data and insights related to the research topic, and the users 102b and 102d of the private non-interactive platform 114. Further, the server system 106 prevents interaction of the user 102 with the members 102b and 102d in the private non-interactive platform 114, and does not disclose any personal identification information of the users 102a-102d in the private non-interactive platform 114 which will be further explained in detail. The server system 106 further renders an option to the user 102a in the private non-interactive platform 114 for upgrading a membership status in the private non-interactive platform 114 which will be explained further in detail.

The number and arrangement of systems, devices, and/or networks shown in FIG. 1 are provided as an example. There may be other systems, devices, and/or networks; fewer systems, devices, and/or networks; different systems, devices, and/or networks, and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices.

Figure 2:
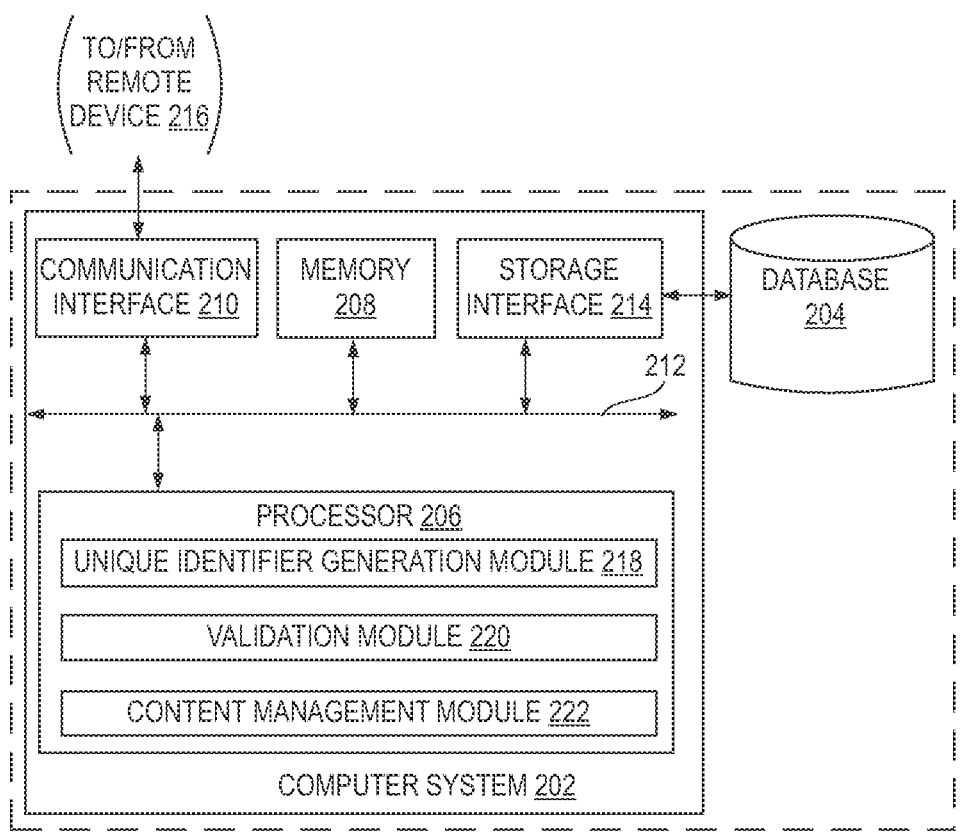
FIG. 2 illustrates a simplified block diagram of a server system used for collecting data and insights related to research topics through disaggregation of user's identity, in accordance with an embodiment of the present disclosure.

FIG. 2 illustrates a simplified block diagram of a server system 200 used for providing the private non-interactive platform 114 for collecting data and insights related to research topics by disaggregation of the user's identity, in accordance with an embodiment of the present disclosure. Examples of the server system 200 include, but are not limited to, the server system 106 as shown in FIG. 1. The server system 200 includes a computer system 202 and a database 204. The computer system 202 includes at least one processor 206 for executing instructions, a memory 208, a communication interface 210, and a storage interface 214. The one or more components of the computer system 202 communicate with each other via a bus 212.

In one embodiment, the database 204 is integrated within the computer system 202 and configured to store an instance of the non-interactive platform 114 and one or more components of the non-interactive platform 114. The one or more components of the non-interactive platform 114 may be, but are not limited to, information related to research topics, unique identifiers, data and insights, and the like. The computer system 202 may include one or more hard disk drives as the database 204. The storage interface 214 is any component capable of providing the processor 206 access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204.

The processor 206 includes suitable logic, circuitry, and/or interfaces to execute computer-readable instructions. Examples of the processor 206 include, but are not limited to, an application-specific integrated circuit (ASIC) processor, a reduced instruction set computing (RISC) processor, a complex instruction set computing (CISC) processor, a field-programmable gate array (FPGA), and the like. The memory 208 includes suitable logic, circuitry, and/or interfaces to store a set of computer-readable instructions for performing operations. Examples of the memory 208 include a random-access memory (RAM), a read-only memory (ROM), a removable storage drive, a hard disk drive (HDD), and the like. It will be apparent to a person skilled in the art that the scope of the disclosure is not limited to realizing the memory 208 in the server system 200, as described herein. In some embodiments, the memory 208 may be realized in the form of a database server or cloud storage working in conjunction with the server system 200, without deviating from the scope of the present disclosure.

The processor 206 is operatively coupled to the communication interface 210 such that the processor 206 is capable of communicating with a remote device 216 such as the user devices 104a-104d, the third party validation system 110, or with any entity connected to the network 112 as shown in FIG. 1.

It is noted that the server system 200 as illustrated and hereinafter described is merely illustrative of an apparatus that could benefit from embodiments of the present disclosure and, therefore, should not be taken to limit the scope of the present disclosure. It is noted that the server system 200 may include fewer or more components than those depicted in FIG. 2.

In one embodiment, the processor 206 includes a unique identifier generation module 218, a validation module 220 and a content management module 222. As such, the one or more components of the processor 206 as described above are communicably coupled with the non-interactive platform 114.

The unique identifier generation module 218 includes a suitable logic and/or interfaces for assigning the unique identifier for the users while registering for the non-interactive platform 114. As explained above, the user 102a is provided with the UI in the public platform (not shown in figures) for completing the registration process. In an embodiment, the public platform may be an application being hosted and managed by the server system 200. Prior to registration, the user 102a is provided with public entitlements. The public entitlements include access to at least public resources related to the research topic, summary of data related to the research topic and ability to subscribe to mailing list. In this scenario, the status of the user 102a is public.

The server system 200 renders a registration form in the public platform. The registration form may include data fields for receiving user inputs related to unique contact information of the user 102a. For example, the unique contact information may be an email address of the user 102a. Alternatively, the unique contact information may include a name, a mobile phone number of the user 102a, etc. Upon filling the registration form, the user 102a provides an input in the public platform which triggers the request to the unique identifier generation module 218. In this scenario, the unique identifier generation module 218 generates the unique identifier to the user 102a by disaggregation of the unique contact information (or user's identity) provided in the registration form. It is to be noted that the unique identifier is created for the user 102a with no requirement for authentication of the user inputs provided in the registration form. This reduces barriers to the collection of sensitive information (or the user information related to the research topics) by protecting the individual's personal privacy. In other words, the unique identifier is created for the user 102a in the private non-interactive platform 114 without imposing checks and balances that necessitate knowing and storing their identifiable information. The user 102a is provided with a subscriber membership, upon successful registration of the user 102a in the private non-interactive platform 114.

The assignment of the unique identifier to the user 102a in the private non-interactive platform 114 prevents unintentional identity exposure which will be explained further in detail. The unique identifier provides access to the user 102a to at least login to the private non-interactive platform 114 and at least one research service rendered in the private non-interactive platform 114. More specifically, the assignment of the unique identifier establishes individuals (i.e., the user 102a) as registrants, thus allowing the user 102a to provide data and insights for the research topics rendered in the private non-interactive platform 114.

In an embodiment, the unique identifier generation module 218 may generate the unique identifier for the user 102a based on receipt of an authentication response from the third-party validation system 110. For example, the third-party validation system 110 may be communicably coupled to third-party application servers (not shown in Figures) which host and manage third-party applications. In one scenario, the user 102a may use at least one third-party application being hosted and managed by the third-party application servers. Thus, the third-party validation system 110 in communication with the third-party application servers performs authentication of the user identity and provides the authentication response to the server system 200. To that effect, the unique identifier generation module 218 verifies the authentication response and generates the unique identifier for the user 102a. This eliminates the user 102a to provide any form of personal identification information (or the unique contact information) in the private non-interactive platform 114.

In another embodiment, the unique identifier generation module 218 is configured to generate a unique code to the user 102a. Particularly, the private non-interactive platform 114 may render one or more registration options to complete the registration process. The user 102a may opt for a registration option among the one or more registration options in the private non-interactive platform 114 which triggers the request to the server system 200 without the need for the user 102a to provide his/her unique contact information (or personal identification information). In this scenario, the unique identifier generation module 218 processes the request triggered by the user 102a and assigns the unique code for the user 102a. The unique code corresponds to the unique identifier. In a similar manner, the unique code allows the user 102a to login to the private non-interactive platform 114 and utilize the at least one research topic rendered in the private non-interactive platform 114. In this embodiment, the server system 200 may not track user activity. Further, the server system 200 may track across research topics via the unique code of the user 102a, thereby enhancing the correlation of data collected related to the research topics in the private non-interactive platform 114.

In another embodiment, the unique identifier generation module 218 is configured to provide a unique registration link to the user 102a. More specifically, the user 102a may opt for another registration option among the one or more registration options which triggers the unique identifier generation module 218 to transmit the unique registration link to the user device 104a of the user 102a. In this scenario, the user 102a may provide an input (or clicks) on the unique registration link which directs the user 102a to the private non-interactive platform 114. Further, the input on the registration link triggers the unique identifier generation module 218 to generate the unique identifier for the user 102. As explained above, the unique identifier is generated for the user 102a without any inputs related to the unique contact information (or personal identification information) of the user 102a. It is to be noted that the unique identifier (or unique code) generated using various registration options as explained above, registers the user 102a in the private non-interactive platform 114 and allows the user 102a to login to the private non-interactive platform 114 and provide the data and insights to the at least one research topic in the private non-interactive platform 114.

The validation module 220 includes a suitable logic and/or interfaces for performing validation of the user information including the data and insights of the research topic provided by the user 102a. More specifically, the user 102a is provided with the research topic hoisted (or rendered) in the private non-interactive platform 114 upon creating the unique identifier. The user 102a provides the data and insights related to the research topic in the private non-interactive platform 114. In other words, the validation module 220 captures the data and insights related to the research topic from the user 102a via the private non-interactive platform 114. As explained above, the user 102a with the unique identifier (or with the 'subscriber membership') is provided the access to the research topic rendered in the private non-interactive platform 114 and is allowed to provide the user information including the data and insights for the research topic in the private non-interactive platform 114.

Upon receipt of the user information related to the research topic, the validation module 220 applies the set of validation rules to confirm if the user information meets the objectives of the community-based research being conducted. More specifically, the validation module 220 determines compliance of the user information based on the set of validation rules. The set of validation rules for determining compliance of the user information includes at least analysis and reporting process, relevance to the research topic, editorial criteria. In other words, the validation module 220 checks for the relevance or suitability of the user information to the research topic. Further, the validation module 220 applies the editorial criteria to determine cuts of the data in the user information. Thereafter, the user information related to the research topic is anonymously aggregated in the private non-interactive platform 114. In this scenario, the user information created by the user 102a is only accessible to administrators (i.e., the user 102c) in the non-interactive platform 114.

The content management module 222 includes a suitable logic and/or interfaces for anonymously submitting the user information related to the research topic in the private non-interactive platform 114. In particular, anonymous submission of the user information related to the research topic in the private non-interactive platform 114 results in aggregation of the deidentified user information related to the research topic with other users' submitted information associated with the research topic in the private non-interactive platform 114.

In an embodiment, the sever system 200 provides a differentiated access to the user information in the private non-interactive platform 114. More specifically, the server system 200 is further configured to provide the differentiated access of the user information submitted anonymously in the private non-interactive platform 114, to the user 102a who contributed related to the research topic and at least the administrator 102c of the private non-interactive platform 114. Thus, it is to be noted that the user 102a with the subscriber membership is provided with access to the public entitlements and provision to access the non-interactive platform 114 for providing inputs related to the research topic as explained above.

Further, the processor 206 is configured to provide an option to the user 102a in the private non-interactive platform 114 for upgrading to a collective membership status in the private non-interactive platform 114. In particular, the processor 206 renders the option in the private non-interactive platform 114 subsequent to the anonymously submitting the data and insights or the user information related to the research topic in the private non-interactive platform 114 by the user 102a for the first time. The user 102a may select the option for upgrading to the collective membership from the subscriber membership in the private non-interactive platform 114. The collective membership allows the user 102a to access a curated set of resources related to the research topics in the private non-interactive platform 114. The curated set of resources may include, but is not limited to, books, websites, expert commentary, podcasts, and video. In an embodiment, the server system 200 may transmit a survey form to the members 102b and 102d and the user 102a of the private non-interactive platform 114 for receiving their opinions (or reviews) related to their user information related to the research topic anonymously aggregated in the private non-interactive platform 114, without any member visibility to unique user identifiers or individual user input.

Figure 3A:
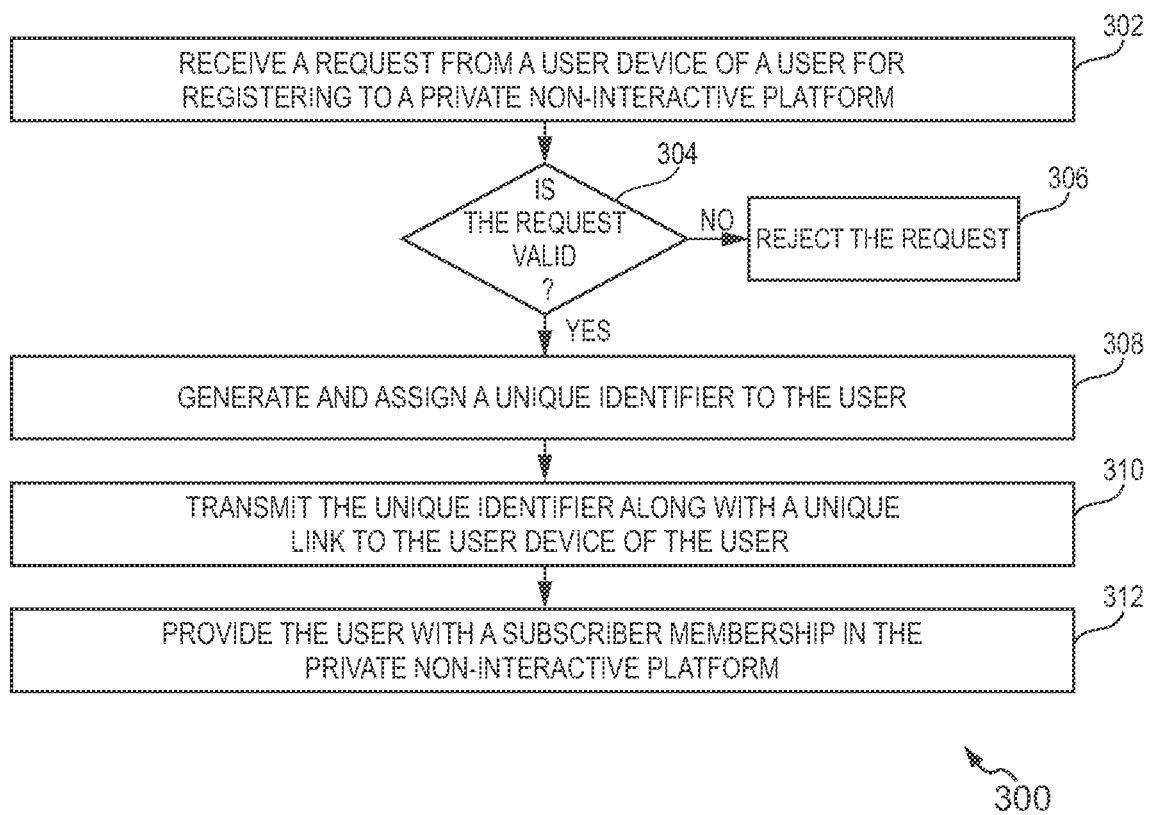
FIG. 3A represents a flowchart depicting a registration process of the private non-interactive platform, in accordance with an embodiment of the present disclosure.

FIG. 3A represents a flowchart 300 depicting a registration process for the private non-interactive platform 114, in accordance with an embodiment of the present disclosure. The one or more operations of the flowchart 300 are performed by the server system 200 or the server system 106.

At 302, the server system 200 receives a request from the user device 104a of the user 102a for registering to the private non-interactive platform 114. At 304, the server system 200 checks validity of the request. More specifically, the server system 200 checks the validity of the request based on determining if the request is triggered by the private non-interactive platform 114 using the one or more registration options. The registration options may include filling out the registration form or unique code generation or the unique registration link. In an embodiment, the private non-interactive platform 114 may be associated with a timer algorithm. The timer algorithm may set a threshold time for the unique registration link within which the user 102a has to provide the input on the unique registration link.

In one scenario, the server system 200 rejects the request for registering to the private non-interactive platform 114, if the request is determined to be invalid (see, 306). For example, the request is determined to be invalid, if the user 102a triggers the request from unique registration link upon expiry of the threshold time. In another scenario, if the request for registration is determined to be genuine, the server system 200 generates and assigns the unique identifier to the user 102a (see, 308). As explained with reference to FIG. 2, the unique identifier is generated for the user 102a by disaggregation of the personal identification information.

At 310, the server system 200 transmits the unique identifier (or the unique code) along with a unique link appended with at least one research topic rendered in the private non-interactive platform 114 to the user device 104a of the user 102a.

At 312, the server system 200 provides the user 102a with the subscriber membership in the private non-interactive platform 114. Further, the operations for performing registration of the users in the private non-interactive platform 114 are already explained with reference to FIG. 2, therefore they are not reiterated herein for the sake of brevity.

Figure 3B:
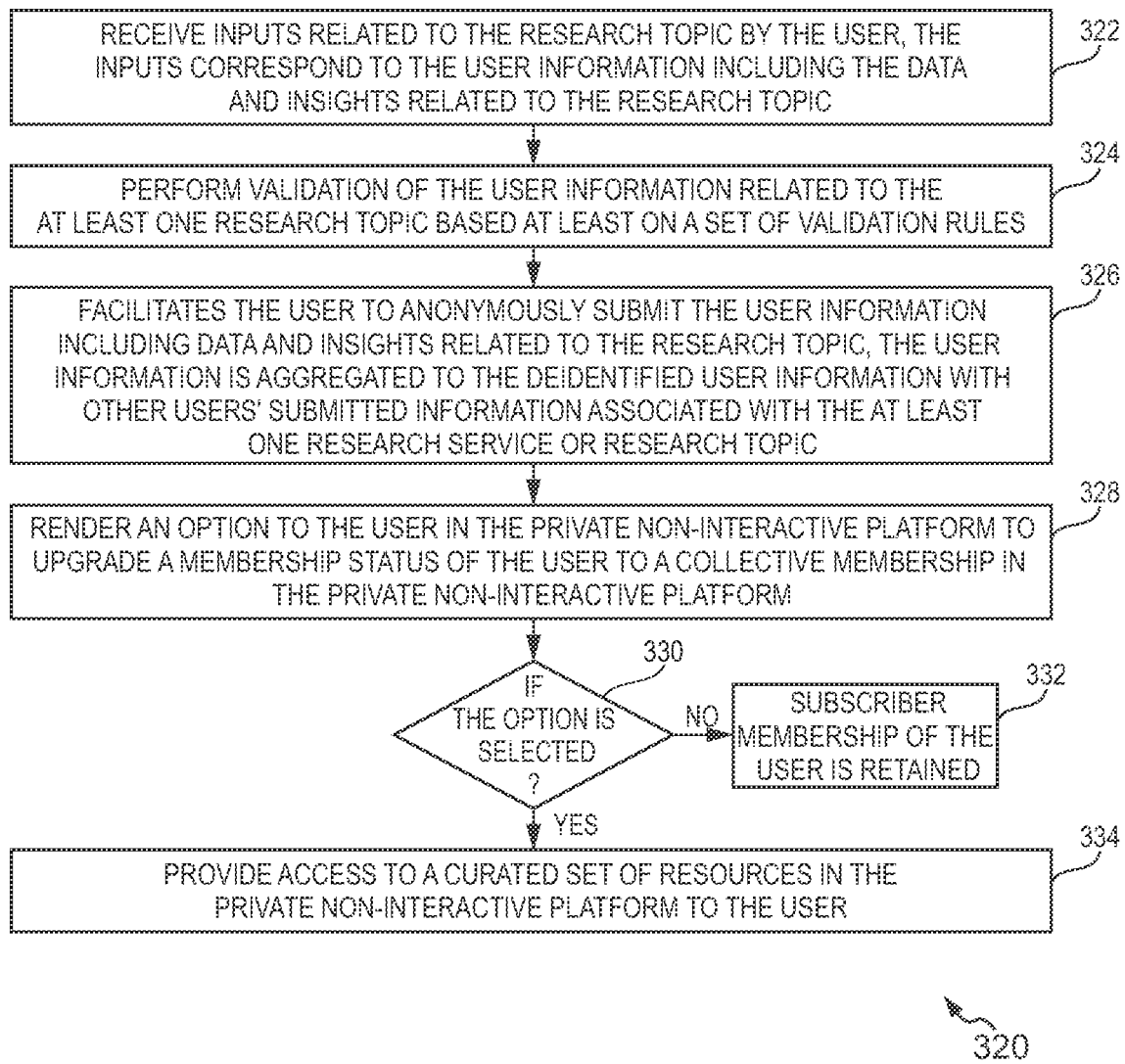
FIG. 3B represents a flowchart for anonymously submitting user information including data and insights related to the research topic in the private non-interactive platform, in accordance with an embodiment of the present disclosure.

FIG. 3B represents a flowchart 320 for anonymously submitting the user information including data and insights related to the research topic in the private non-interactive platform 114, in accordance with an embodiment of the present disclosure.

At 322, the server system 200 receives inputs related to the research topic by the user 102a. More specifically, the user 102a clicks on the unique link which provides the user 102a access to the private non-interactive platform 114 to provide inputs related to the research topic by using the at least one research service of the private non-interactive platform 114. The inputs correspond to the user information including the data and insights related to the research topic.

At 324, the server system 200 performs validation of the user information related to the research topic based at least on the set of validation rules. The server system 200 performs validation of the user information to determine data cuts in the user information based on the set of validation rules the set of validation rules may include relevance to the research topic, editorial criteria, etc.

At 326, the server system 200 facilitates the user 102a to anonymously submit the user information including data and insights related to the research topic. The user information is aggregated to the deidentified user information with other users' submitted information associated with the at least one research service or research topic.

At 328, the server system 200 renders an option in the private non-interactive platform 114 to upgrade a membership status of the user 102a to a collective membership in the private non-interactive platform 114. The option to upgrade the membership is provided upon submitting the data and insights related to the research topic for the first time as explained with reference to FIG. 2.

At 330, the server system 200 checks if the user 102a selects the option for upgrading the membership status to the collective membership. In one scenario, if the option for upgrading to the collective membership is not selected (or rejected) by the user 102a, the subscriber membership of the user 102a is retained in the private non-interactive platform 114 (see, 332). In this scenario, the user 102a is provided with limited options in the non-interactive platform 114 as explained in steps 324 and 326. In another scenario, the server system 200 provides access to the curated set of resources in the private non-interactive platform if the user 102a selects the option for upgrading to the collective membership in the private non-interactive platform 114 (see, 334). Further, the user 120a may be allowed to submit own content to the editorial process in the private non-interactive platform 114, if the user 102a is associated with the collective membership. The operations for anonymously submitting the content in the private non-interactive platform 114 are already explained with reference to FIG. 2, therefore they are not reiterated herein for the sake of brevity.

Figure 4:
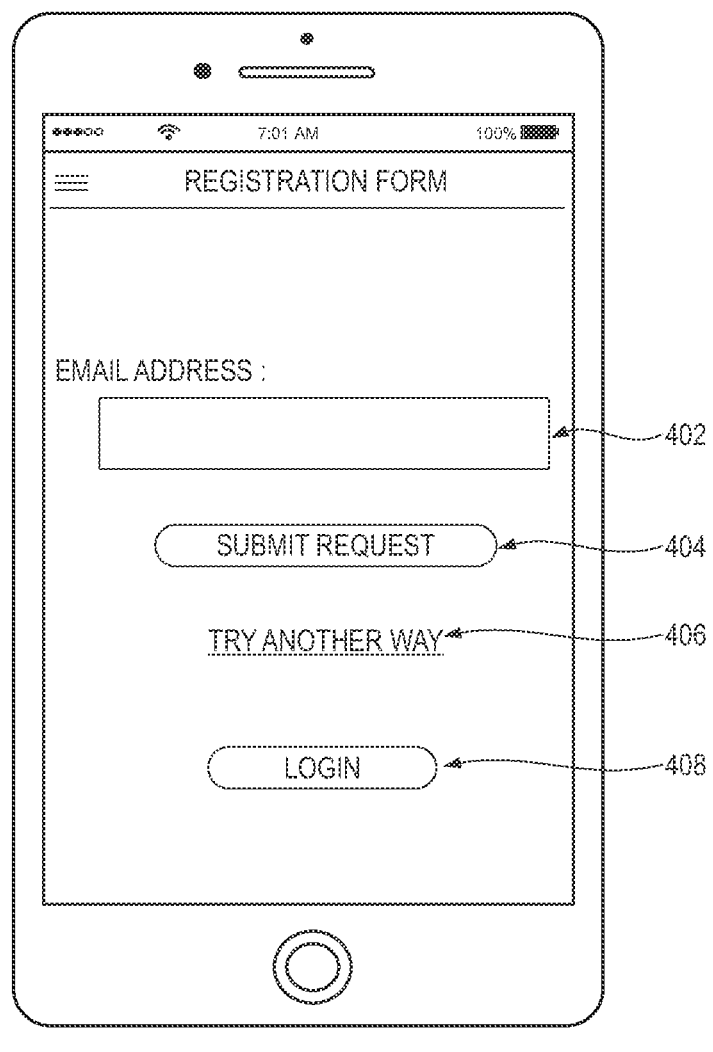
FIG. 4 illustrates an example representation of a user interface (UI) depicted to a user for completing a one-time registration process, in accordance with an embodiment of the present disclosure.

FIG. 4 illustrates an example representation of a user interface (UI) 400 depicted to the user 102a for completing a one-time registration process, in accordance with an embodiment of the present disclosure. The UI 400 corresponds to a registration form. Further, the UI 400 is depicted to include a data field 402 for receiving the unique contact information of the user 102a for performing the one-time registration process. As shown in FIG. 4, the unique contact information is an email address of the user 102a. Upon entering the email address in the data field 402, the user 102a may provide an input on a button associated with the text "SUBMIT REQUEST" (see, 404). Thereafter, the private non-interactive platform 114 transmits the request to the server system 200.

Further, the UI 400 is depicted to include an option 406 associated with the text "TRY ANOTHER WAY". In one scenario, the user 102a may click on the option 406, if the user 102a does not want to provide any personal identification information. In this scenario, the user 102a is directed to a UI (not shown in Figures) which renders the one or more registration options apart from the one depicted in the UI 400. As explained above, the user 102a may be provided with the registration options such as generating the unique code or registering through the unique link, etc. Further, the one or more registration options are already explained with reference to FIG. 2, therefore they are not reiterated herein for the sake of brevity.

The UI 400 further includes an option 408 associated with the text "LOGIN". If the user 102a is a registered user in the private non-interactive platform 114, the user 102a may click on the option 408 to provide the unique identifier assigned to the user 102a to login to the private non-interactive platform.

Figure 5:
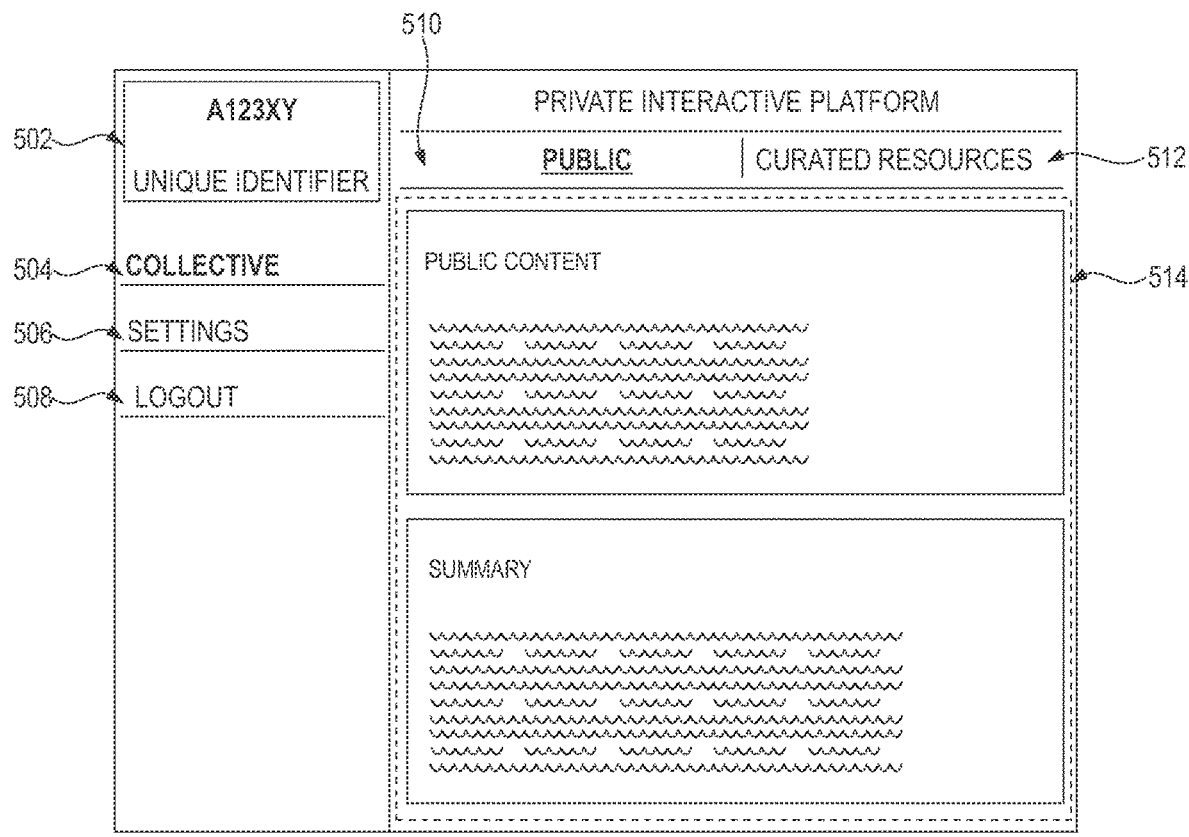
FIG. 5 illustrates an example representation of a user interface (UI) depicting a content page of the private non-interactive platform, in accordance with an embodiment of the present disclosure.

FIG. 5 illustrates an example representation of a user interface (UI) 500 depicting a content page of the private non-interactive platform 114, in accordance with an embodiment of the present disclosure. The UI 500 is rendered in the private non-interactive platform 114 to the user 102a, if the user 102a is associated with the collective membership in the private non-interactive platform 114. The UI 500 is depicted to include a dashboard section. The dashboard section of the UI 500 depicts the unique identifier 502 (exemplarily depicted to be "A123XY") of the user 102a. The private non-interactive platform 114 prevents the user 102a and the users 102b and 102d to upload any display picture. Further, the private non-interactive platform 114 does not provide features for users to provide profile/user name, photos, avatars, etc. to prevent intentional or unintentional exposure of personally identifiable information or the capture of such within the private non-interactive platform.

The UI 500 further depicts an option 504 associated with the text "COLLECTIVE". As explained above, the option 504 is provided to the user 102a, if the user 102a has opted for the collective membership. Further, the user 102a may access settings in the private non-interactive platform 114 by providing input on an option 506. The user 102a may provide an input on an option 508 to logout (or sign out) from the private non-interactive platform 114.

The UI is depicted to include an option 510 and an option 512 associated with the text "PUBLIC" and "CURATED RESOURCES", respectively. Further, the UI 500 is depicted to include a content section 514. It is to be noted that the user 102*a* is rendered with the options 510, 512 and the content section 514 upon providing a selection input on the option 504. Further, the user 102*a* may click on the option 510 to access the public entitlements and use the option 512 to access the curated set of resources.

Furthermore, the users 102*a*-102*d* are prevented from interacting with one another in the private non-interactive platform 114. The private non-interactive platform 114 does not maintain a list of registered users or directory. The private non-interactive platform 114 does not provide any options to make connections with one another, provide commentary, or react to the content available within the community. As explained above, even the unique identifier of a user is not made available in the content section 514. This mechanism offers privacy and shields the users 102*a*-102*d* from unwanted scrutiny, intrusion, etc., while enabling an individual user to contribute in ways that support the research topic in the private non-interactive platform 114 and support increased knowledge of the research subject or topic of focus in the public sphere through the publishing of aggregated deidentified insights derived from individual input submitted by users (subscribers and members). In other words, the private interactive platform 114 does not disclose any of the personal identification information of the users in the private non-interactive platform 114. Further, the users 102*a*-102*d* are prevented from editing their unique identifier, or creating profiles or adding avatars, photos or adding any user personal identification information in the private non-interactive platform 114. Furthermore, the private non-interactive platform 114 prevents any of the users 102*a*-102*d* the ability to directly publish content of any kind within the private non-interactive platform 114 (to either the public, subscribers, or members), to post or share any user information associated with the research topic or any other topic under/through the assigned unique identifier, or via any other means.

Figure 6:
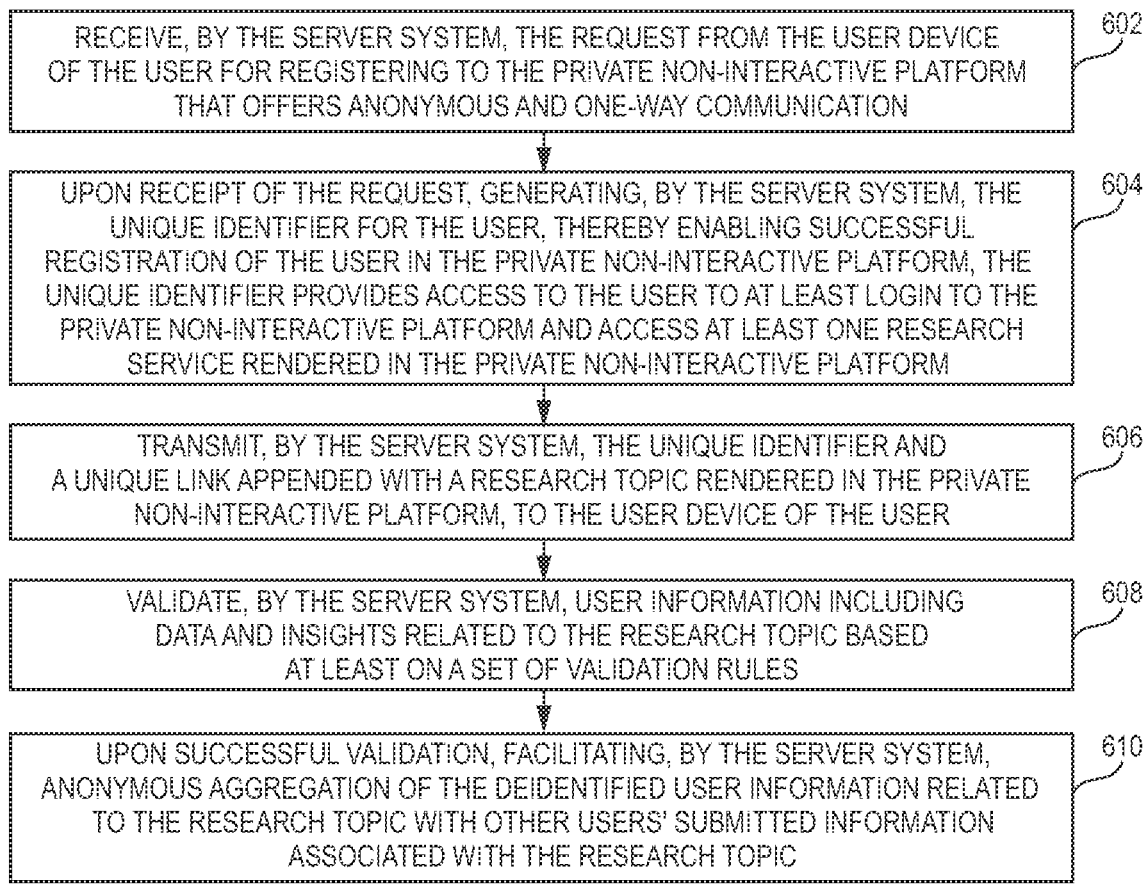
FIG. 6 illustrates a flow diagram of a computer-implemented method for collecting data in the private non-interactive platform through disaggregation of the user's identity, in accordance with an embodiment of the present disclosure.

FIG. 6 illustrates a flow diagram of a computer-implemented method 600 for collecting data in the private non-interactive platform 114 through disaggregation of the user's identity, in accordance with an embodiment of the present disclosure. The method 600 depicted in the flow diagram may be executed by, for example, the server system 200 or the server system 106. Operations of the flow diagram of the method 600, and combinations of the operations in the flow diagram of the method 600, may be implemented by, for example, hardware, firmware, a processor, circuitry, and/or a different device associated with the execution of software that includes one or more computer program instructions. It is noted that the operations of the method 600 can be described and/or practiced by using a system other than these server systems. The method 600 starts at operation 602.

At operation 602, the method 600 includes receiving, by the server system 200, the request from the user device 104*a* of the user 102*a* for registering to the private non-interactive platform 114 that offers anonymous and one-way communication.

At operation 604, the method 600 includes upon receipt of the request, generating, by the server system 200, the unique identifier for the user 102*a*, thereby enabling successful registration of the user 102*a* in the private non-interactive platform 114. The unique identifier provides access to the user 102*a* to at least login to the private non-interactive platform 114 and access at least one research service rendered in the private non-interactive platform 114.

At operation 606, the method 600 includes transmitting, by the server system 200, the unique identifier and a unique link appended with a research topic rendered in the private non-interactive platform 114, to the user device 104*a* of the user 102*a*.

At operation 608, the method 600 includes validating, by the server system 200, user information including data and insights related to the research topic based at least on a set of validation rules.

At operation 610, the method 600 includes upon successful validation, facilitating, by the server system 200, anonymous aggregation of the deidentified user information related to the research topic with other users' submitted information associated with the research topic. Further, the process related to collecting the content (or the data and insights) from the users in the private non-interactive platform 114 through disaggregation of the user's identity is already explained above, and therefore they are not reiterated, for the sake of brevity.

Figure 7:
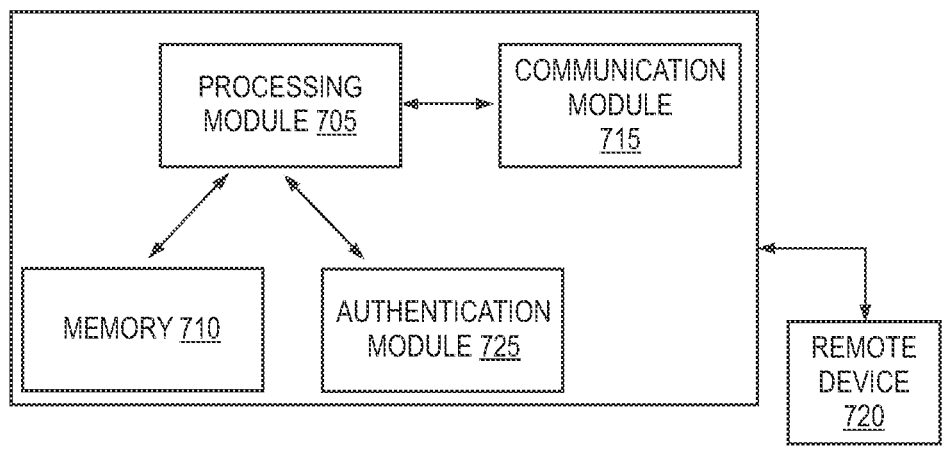
FIG. 7 illustrates a simplified block diagram representation of a third-party validation system, in accordance with an embodiment of the present disclosure.

FIG. 7 is a simplified block diagram of a third-party validation system 700, in accordance with an embodiment of the present disclosure. The third-party validation system 700 is an example of the third-party validation system 110 of FIG. 1. The third-party validation system 700 may be a separate part, and may operate apart via the network 112 (as shown in FIG. 1). The third-party validation system 700 is configured to validate the users (e.g., the user 102*a*), thereby allowing server system 200 to perform registration of the user 102*a* in the private non-interactive platform 114.

The third-party validation system 700 includes a processing module 705 for executing instructions. Instructions may be stored in, for example, but not limited to, a memory 710. The processing module 705 may include one or more processing units (e.g., in a multi-core configuration). The processing module 705 is operatively coupled to a communication module 715 such that the third-party validation system 700 is capable of communicating with a remote device 720 such as the server system 200 or any other entity of FIG. 1. For example, the communication module 715 may receive at least unique contact information of the users or the request. An authentication module 725 is configured to authenticate or validate the user 102*a* as explained with reference to FIG. 2

Figure 8:
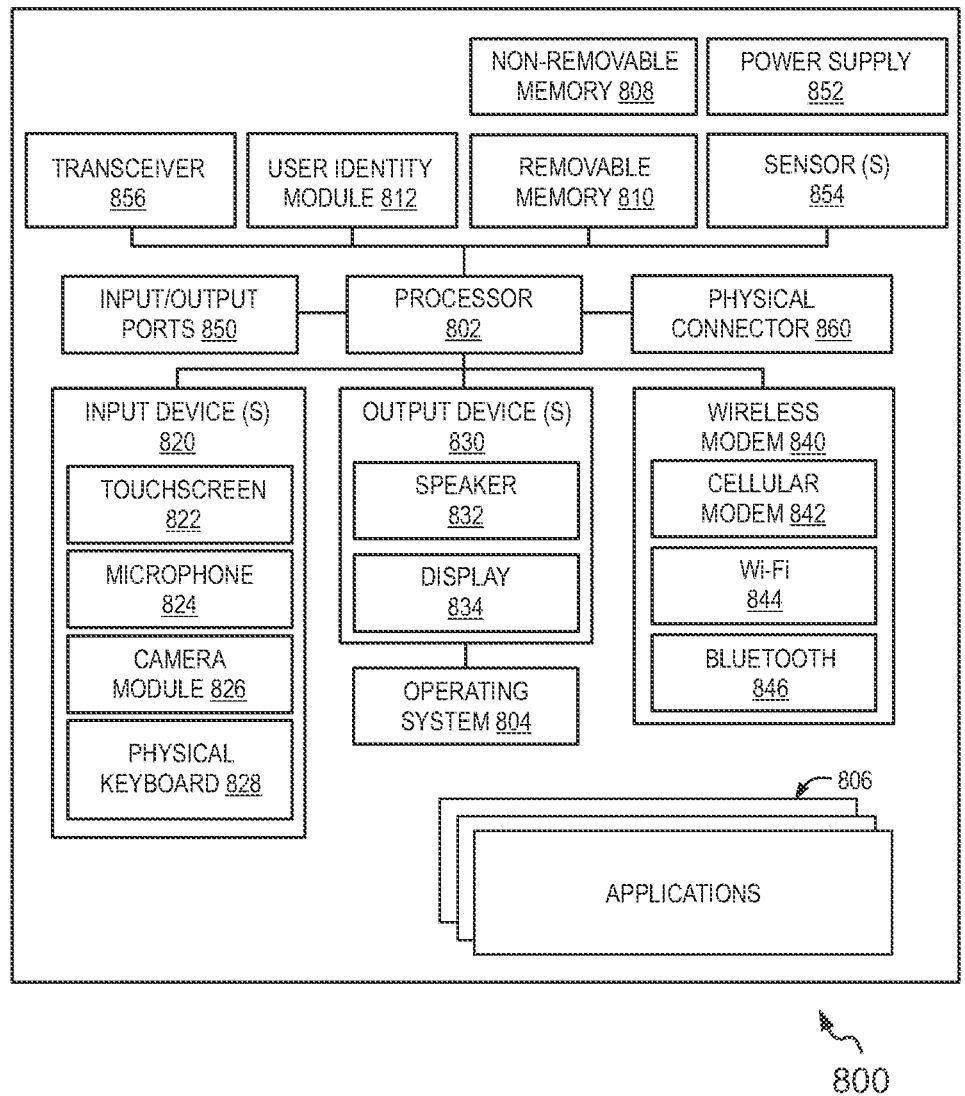
FIG. 8 is a simplified block diagram of an electronic device capable of implementing various embodiments of the present disclosure.

FIG. 8 is a simplified block diagram of an electronic device 800 capable of implementing various embodiments of the present disclosure. For example, the electronic device 800 may correspond to the user devices 104*a*-104*d* of FIG. 1. The electronic device 800 is depicted to include one or more applications 806. For example, the one or more applications 806 may include the private non-interactive platform 114 of FIG. 1. One of the one or more applications 806 installed on the electronic device 800 is capable of communicating with a server (i.e., the server system 200 or the server system 106) for collecting data in the private non-interactive platform 114 through disaggregation of the user's identity.

It should be understood that the electronic device 800 as illustrated and hereinafter described is merely illustrative of one type of device and should not be taken to limit the scope of the embodiments. As such, it should be appreciated that at least some of the components described below in connection with the electronic device 800 may be optional and thus in an embodiment may include more, less or different components than those described in connection with the embodiment of the FIG. 8. As such, among other examples, the electronic device 800 could be any of a mobile electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated electronic device 800 includes a controller or a processor 802 (e.g., a signal processor, microprocessor, ASIC, or other control and processing logic circuitry) for performing such tasks as signal coding, data processing, image processing, input/output processing, power control, and/or other functions. An operating system 804 controls the allocation and usage of the components of the electronic device 800 and supports for one or more operations of the application (see, the applications 806) that implements one or more of the innovative features described herein. In addition, the applications 806 may include common mobile computing applications (e.g., telephony applications, email applications, calendars, contact managers, web browsers, messaging applications) or any other computing application.

The illustrated electronic device 800 includes one or more memory components, for example, a non-removable memory 808 and/or removable memory 810. The non-removable memory 808 and/or the removable memory 810 may be collectively known as a database in an embodiment. The non-removable memory 808 can include RAM, ROM, flash memory, a hard disk, or other well-known memory storage technologies. The removable memory 810 can include flash memory, smart cards, or a Subscriber Identity Module (SIM). The one or more memory components can be used for storing data and/or code for running the operating system 804 and the applications 806. The electronic device 800 may further include a user identity module (UIM) 812. The UIM 812 may be a memory device having a processor built in. The UIM 812 may include, for example, a subscriber identity module (SIM), a universal integrated circuit card (UICC), a universal subscriber identity module (USIM), a removable user identity module (R-UIM), or any other smart card. The UIM 812 typically stores information elements related to a mobile subscriber. The UIM 812 in form of the SIM card is well known in Global System for Mobile (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 800 can support one or more input devices 820 and one or more output devices 830. Examples of the input devices 820 may include, but are not limited to, a touch screen/a display screen 822 (e.g., capable of capturing finger tap inputs, finger gesture inputs, multi-finger tap inputs, multi-finger gesture inputs, or keystroke inputs from a virtual keyboard or keypad), a microphone 824 (e.g., capable of capturing voice input), a camera module 826 (e.g., capable of capturing still picture images and/or video images) and a physical keyboard 828. Examples of the output devices 830 may include, but are not limited to, a speaker 832 and a display 834. Other possible output devices can include piezoelectric or other haptic output devices. Some devices can serve more than one input/output function. For example, the touch screen 822 and the display 834 can be combined into a single input/output device.

A wireless modem 840 can be coupled to one or more antennas (not shown in FIG. 8) and can support two-way communications between the processor 802 and external devices, as is well understood in the art. The wireless modem 840 is shown generically and can include, for example, a cellular modem 842 for communicating at long range with the mobile communication network, a Wi-Fi compatible modem 844 for communicating at short range with an external Bluetooth-equipped device or a local wireless data network or router, and/or a Bluetooth-compatible modem 846. The wireless modem 840 is typically configured for communication with one or more cellular networks, such as a GSM network for data and voice communications within a single cellular network, between cellular networks, or between the electronic device 800 and a public switched telephone network (PSTN).

The electronic device 800 can further include one or more input/output ports 850, a power supply 852, one or more sensors 854 for example, an accelerometer, a gyroscope, a compass, or an infrared proximity sensor for detecting the orientation or motion of the electronic device 800 and biometric sensors for scanning biometric identity of an authorized user, a transceiver 856 (for wirelessly transmitting analog or digital signals) and/or a physical connector 860, which can be a USB port, IEEE 1294 (FireWire) port, and/or RS-232 port. The illustrated components are not required or all-inclusive, as any of the components shown can be deleted and other components can be added.

The disclosed method with reference to FIG. 6, or one or more operations of the server system 200 may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as Flash memory components) and executed on a computer (e.g., any suitable computer, such as a laptop computer, netbook, Web book, tablet computing device, smartphone, or other mobile computing devices). Such software may be executed, for example, on a single local computer or in a network environment (e.g., via the Internet, a wide-area network, a local-area network, a remote web-based server, a client-server network (such as a cloud computing network), or other such networks) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application-specific integrated circuit (ASIC) circuitry and/or in Digital Signal Processor (DSP) circuitry).

Particularly, the server system 200 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer-readable media. Non-transitory computer-readable media include any type of tangible storage media. Examples of non-transitory computer-readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer-readable media. Examples of transitory computer-readable media include electric signals, optical signals, and electromagnetic waves. Transitory computer-readable media can provide the program to a computer via a wired communication line (e.g., electric wires, and optical fibers) or a wireless communication line.

Various embodiments of the disclosure, as discussed above, may be practiced with steps and/or operations in a different order, and/or with hardware elements in configurations, which are different than those which are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method, comprising:
   receiving, by a server system, a request from a user device of a user for registering to a private non-interactive platform that offers anonymous and one-way communication;
   upon receipt of the request, generating, by the server system, a unique identifier for the user, thereby enabling successful registration of the user in the private non-interactive platform, wherein the unique identifier provides access to the user to at least login to the private non-interactive platform and access at least one research service rendered in the private non-interactive platform;
   transmitting, by the server system, the unique identifier and a unique link appended with a research topic rendered in the private non-interactive platform, to the user device of the user;
   validating, by the server system, user information comprising data and insights related to the research topic based at least on a set of validation rules;
   upon successful validation, facilitating, by the server system, anonymous aggregation of the deidentified user information related to the research topic with other users' submitted information associated with the research topic; and
   rendering, by the server system, an option to the user in the private non-interactive platform for upgrading to a collective membership, wherein the option is rendered to the user in the private non-interactive platform subsequent to aggregating the user information related to the research topic in the private non-interactive platform.

2. The computer-implemented method as claimed in claim 1, wherein validating the user information based at least on the set of validation rules further comprises:
   generating, by the server system, the user information for aggregation in the private non-interactive platform based on determining compliance of the user information with the set of validation rules, the set of validation rules for determining compliance of the user information comprising at least analysis and reporting process, relevance to the research topic and editorial criteria; and
   facilitating, by the server system, the aggregation of the user information in the private non-interactive platform upon determining the compliance of the user information with the set of validation rules.

3. The computer-implemented method as claimed in claim 1, wherein the server system is further configured to provide a differentiated access of the user information submitted anonymously in the private non-interactive platform, to the user who contributed related to the research topic and at least an administrator of the private non-interactive platform.

4. The computer-implemented method as claimed in claim 1, further comprising:
   providing, by the server system, access to a curated set of resources related to the research topics in the private non-interactive platform to the user based on determining a membership status of the user to be the collective membership, the curated set of resources comprising books, websites, expert commentary, podcasts and videos.

5. The computer-implemented method as claimed in claim 1, further comprising:
   providing, by the server system, a survey form to at least members and the user of the private non-interactive platform for receiving opinions from the members and the user related to the data and insights of the research topic submitted anonymously, without any member visibility to unique user identifiers and individual user input.

6. The computer-implemented method as claimed in claim 1, further comprising:
transmitting, by the server system, a unique registration link to the user device of the user in response to receipt of the request for registering in the private non-interactive platform; and
generating, by the server system, the unique identifier for the user in the private non-interactive platform in response to a user input provided by the user on the unique registration link, wherein the unique identifier is generated without the inputs related to the personal identification information of the user.

7. The computer-implemented method as claimed in claim 1, wherein the server system is communicably coupled with a third-party validation system for validating the user for enabling registration of the user in the private non-interactive platform.

8. The computer-implemented method as claimed in claim 1, wherein the server system is configured to prevent at least interaction of the user with members in the private non-interactive platform, and to prevent visibility of the unique identifier associated with the user to the members in the private non-interactive platform, to prevent user and member visibility to individual users' information submitted using the at least one research service, and to prevent visibility of all members.

9. A server system, comprising:
a communication interface;
a memory storing executable instructions; and
a processor operatively coupled with the communication interface and the memory, the processor configured to execute the executable instructions to cause the server system to at least: receive a request from a user device of a user for registering to a private non-interactive platform that offers anonymous and one-way communication,
upon receipt of the request, generate a unique identifier for the user for successfully registering the user in the private non-interactive platform, wherein the unique identifier provides access to the user to at least login to the private non-interactive platform and access at least one research service rendered in the private non-interactive platform,
transmit the unique identifier and a unique link appended with a research topic rendered in the private non-interactive platform, to the user device of the user,
validate user information comprising data and insights related to the research topic based at least on a set of validation rules,
upon successful validation, facilitate, anonymous aggregation of the deidentified user information related to the research topic with other users' submitted information associated with the research topic, and
render an option to the user in the private non-interactive platform for upgrading to a collective membership, wherein the option is rendered to the user in the private non-interactive platform subsequent to aggregating the user information related to the research topic in the private non-interactive platform.

10. The server system as claimed in claim 9, wherein the server system is further configured to:
generate the user information for aggregation in the private non-interactive platform based on determining compliance of the user information with the set of validation rules, the set of validation rules for determining compliance of the user information comprising at least analysis and reporting process, relevance to the research topic and editorial criteria; and
facilitate anonymously, the aggregation of the user information in the private non-interactive platform upon determining the compliance of the user information with the set of validation rules.

11. The server system as claimed in claim 9, wherein the server system is further configured to provide a differentiated access of the user information submitted by individual users anonymously, deidentified and aggregated in the private non-interactive platform, to the user who contributed for creating the user information related to the research topic and at least an administrator of the private non-interactive platform.

12. The server system as claimed in claim 9, wherein the server system is further configured to:
provide access to a curated set of resources related to the research topics in the private non-interactive platform to the user based on determining a membership status of the user to be the collective membership, the curated set of resources comprising books, websites, expert commentary, podcasts and videos.

13. The server system as claimed in claim 9, wherein the server system is further configured to:
provide a survey form to at least members and the user of the private non-interactive platform for receiving opinions from the members and the user related to the data and insights of the research topic submitted anonymously, without any member visibility to unique user identifiers or individual user input.

14. The server system as claimed in claim 9, wherein the server system is further configured to:
transmit a unique registration link to the user device of the user in response to the receipt of the request for registering in the private non-interactive platform; and
generate the unique identifier for the user in the private non-interactive platform in response to a user input provided by the user on the unique registration link, wherein the unique identifier is generated without the inputs related to the personal identification information of the user.

15. The server system as claimed in claim 9, wherein the server system is communicably coupled with a third-party validation system for validating the user for enabling registration of the user in the private non-interactive platform.

16. The server system as claimed in claim 9, wherein the server system is configured to prevent at least interaction of the user with members in the private non-interactive platform, and to prevent visibility of the unique identifier associated with the user to the members in the private non-interactive platform, to prevent user and member visibility to individual users' information submitted using the at least one research service, and to prevent visibility of all members.

* * * * *